(12) United States Patent
Kim

(10) Patent No.: US 11,413,941 B2
(45) Date of Patent: Aug. 16, 2022

(54) ELECTRIC WINDOW SHADE APPARATUS FOR VEHICLE

(71) Applicants: HYUNDAI MOTOR COMPANY, Seoul (KR); KIA MOTORS CORPORATION, Seoul (KR)

(72) Inventor: Dong Han Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/094,065

(22) Filed: Nov. 10, 2020

(65) Prior Publication Data

US 2022/0009321 A1   Jan. 13, 2022

(30) Foreign Application Priority Data

Jul. 9, 2020 (KR) .................. 10-2020-0084865

(51) Int. Cl.
B60J 1/20 (2006.01)

(52) U.S. Cl.
CPC ............ *B60J 1/2025* (2013.01); *B60J 1/205* (2013.01); *B60J 1/2016* (2013.01); *B60J 1/2044* (2013.01); *B60J 1/2052* (2013.01); *B60J 1/2069* (2013.01); *B60J 1/2061* (2013.01)

(58) Field of Classification Search
CPC ...... B60J 1/2025; B60J 1/2016; B60J 1/2044; B60J 1/205; B60J 1/2052; B60J 1/2069; B60J 1/2086
USPC ............................ 296/97.4, 97.8; 160/DIG. 3
See application file for complete search history.

(56) References Cited

U.S. PATENT DOCUMENTS

| | | | | |
|---|---|---|---|---|
| 6,047,762 A | * | 4/2000 | Anderson | B60J 1/2019 160/265 |
| 6,682,133 B2 | * | 1/2004 | Glasl | B60J 7/0015 160/370.22 |
| 6,910,518 B2 | * | 6/2005 | Zimmermann | B60J 1/2025 160/370.22 |

(Continued)

FOREIGN PATENT DOCUMENTS

| | | | | |
|---|---|---|---|---|
| CN | 112829552 A | * | 5/2021 | |
| DE | 19834777 A1 | * | 2/2000 | B60J 1/2027 |

(Continued)

OTHER PUBLICATIONS

Bergmiller et al., "Roller blind, in particular sun protection roller blind for the transparent roof window of a motor vehicle" DE19834777 English Translation (Year: 2002).*

(Continued)

*Primary Examiner* — Jason S Morrow
*Assistant Examiner* — Wenwei Zhuo
(74) *Attorney, Agent, or Firm* — Morgan, Lewis & Bockius LLP

(57) ABSTRACT

An electric window shade apparatus for a vehicle is proposed, the electric window shade apparatus being configured to receive power directly from a motor. An electric window shade apparatus for a vehicle according to an embodiment of the present disclosure includes: a shade module configured to be unwound or wound automatically by a driving force so as to move with respect to a window glass; and a driving module providing the driving force to the shade module by an operation of a cable wound on at least one drum driven by a motor.

12 Claims, 7 Drawing Sheets

100(110~125)
200(201~222)

(56) References Cited

U.S. PATENT DOCUMENTS

| | | | | |
|---|---|---|---|---|
| 7,503,374 B2* | 3/2009 | Takeuchi | ............... | B60J 1/2027 160/370.21 |
| 7,857,035 B2* | 12/2010 | Miyachi | ................. | B60J 1/2027 160/370.22 |
| 7,896,058 B2* | 3/2011 | Hansen | ................. | B60J 1/2033 160/370.22 |
| 8,281,847 B2* | 10/2012 | Uehara | ................. | B60J 7/0015 160/265 |
| 8,939,189 B2* | 1/2015 | Ojima | .................... | B60J 1/2022 160/120 |
| 2001/0022218 A1* | 9/2001 | Schlecht | ................ | B60J 1/2027 160/370.22 |
| 2004/0040672 A1* | 3/2004 | Nagar | .................... | B60J 1/2077 160/98 |
| 2005/0061454 A1* | 3/2005 | Chen | ...................... | B60J 1/2052 160/370.22 |
| 2008/0179024 A1* | 7/2008 | Fichter | .................. | B60J 1/2058 160/370.22 |
| 2011/0232851 A1* | 9/2011 | Uehara | ................. | B60J 1/2025 160/317 |
| 2012/0193044 A1* | 8/2012 | Ojima | .................... | B60J 1/2055 160/370.22 |
| 2018/0297452 A1* | 10/2018 | Hintennach | ............ | B60J 1/2069 |
| 2021/0046807 A1* | 2/2021 | Marzinke | ............. | B66D 1/7447 |

FOREIGN PATENT DOCUMENTS

| | | | | |
|---|---|---|---|---|
| DE | 102018218198 A1 | * | 4/2020 | |
| EP | 0531634 A1 | * | 3/1993 | |
| EP | 1645448 A1 | * | 4/2006 | ............ B60J 1/2025 |
| FR | 2958224 A1 | * | 10/2011 | ............ B60J 1/2044 |
| KR | 20090049991 A | * | 5/2009 | ............ B60J 1/2086 |
| KR | 20120118831 A | * | 10/2012 | |
| KR | 10-1567213 B1 | | 11/2015 | |

OTHER PUBLICATIONS

Aubineau Herman, "Occultation storage for a motor vehicle having a release tube having trunconic pulleys" FR2958224 English Translation (Year: 2011).*

* cited by examiner

ELECTRIC WINDOW SHADE APPARATUS FOR VEHICLE

CROSS REFERENCE TO RELATED APPLICATION

The present application claims priority to Korean Patent Application No. 10-2020-0084865, filed Jul. 9, 2020, the entire contents of which are incorporated herein for all purposes by this reference.

TECHNICAL FIELD

The present disclosure relates generally to an electric window shade apparatus for a vehicle, and more particularly, to a direct drive type electric window shade apparatus for a vehicle, the electric window shade apparatus being configured to receive power directly from a motor.

BACKGROUND

Recently, a window shade apparatus has been provided in a vehicle to block out sunlight incident into a vehicle interior through a window glass provided on a vehicle door.

Through provision of such a window shade apparatus, it is possible to provide comfort to occupants and prevent an excessive increase in interior temperature.

Describing in brief the configuration of a related-art door window shade apparatus, a roll on which a shade is wound is provided between an inner panel and a door trim of the door, and a shade bar at the top of the shade is supported on the lower edge of a window frame.

Accordingly, when the shade is to be used, a knob provided on the shade bar is pulled upward, causing the shade to be extended while being unwound from the roll, and then the knob provided on the shade bar of the extended shade is hooked to the upper edge of the window frame to secure the shade in place.

In the related art, the shade is manually operated by the occupant in this way, while in recent years, there has been a trend toward the use of an electric window shade apparatus in which the shade can be extended and retracted easily in response to a remote operation by the driver from a driver's seat or the occupant from an occupant's seat.

A typical electric window shade apparatus is configured such that a motor drives a worm wheel gear, a rotational movement of the worm wheel gear is converted into a linear movement through a flex wire, and a driving force converted into a linear movement is used to move the shade bar of the shade.

However, in this case, the distance between the position of the motor and the shade bar as an object to be controlled is long, and due to this fact, the path of the flex wire is lengthened, which inevitably involves generation of high friction. Further, due to the high friction generated during the operation of the shade, the operating load of the motor is increased, with the result that malfunction and noise generation are increased, which is problematic.

Thus, various types of electric window shade apparatuses have been studied in an effort to solve this problem.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problem occurring in the related art, and an objective of the present disclosure is to provide a direct drive type electric window shade apparatus for a vehicle, wherein a shade bar is moved by the use of a plurality of drums and pulleys that receive power directly from a motor.

In order to achieve the above objective, according to one aspect of the present disclosure, there is provided an electric window shade apparatus for a vehicle, the electric window shade apparatus including: a shade module configured to be unwound or wound automatically by a driving force so as to move with respect to a window glass; and a driving module configured to provide the driving force to the shade module by an operation of a cable wound on at least one drum directly driven in response to an operation of a motor.

The driving module may include: the motor disposed inside a door trim; the at least one drum rotatable by being connected to the motor; at least one cable having a first side wound on an outer circumferential surface of the drum so that the cable operates the shade module while being moved in conjunction with rotation of the drum; and at least one pulley, on which a second side of the cable is wound, the pulley configured to determine a moving path of the cable.

The driving module may include: a first drum and a second drum rotatable by being directly connected to a rotary shaft of the motor; a first cable having a first side wound on an outer circumferential surface of the first drum so that the first cable operates the shade module while being moved in conjunction with rotation of the first drum; at least one first pulley, on which a second side of the first cable is wound, the first pulley configured to determine a moving path of the first cable; a second cable having a first side wound on an outer circumferential surface of the second drum so that the second cable operates the shade module while being moved in conjunction with rotation of the second drum; and at least one second pulley, on which a second side of the second cable is wound, the second pulley configured to determine a moving path of the second cable.

The shade module may include: a main shade configured to be unwound or wound so as to move with respect to a side window glass; a main shade roller disposed inside the door trim and connected to a first end of the main shade to wind or unwind the main shade; a main shade bar connected to a second end of the main shade; a pair of main guide rails vertically arranged at respective positions spaced apart from opposite sides of the main shade; and a pair of main sliders secured to opposite ends of the main shade bar, respectively, and configured to unwind or wind the main shade from the main shade roller while being moved in respective vertical directions along the pair of main guide rails.

The cable may include a plurality of cables, and each of the pair of main sliders may be secured to an associated one of the cables to be moved integrally in conjunction with movement of the cable.

The main shade roller may be provided with a main spring that provides a restoring force to the main shade after rotation.

The shade module may further include: a sub-shade configured to be unwound or wound so as to move with respect to a quarter window glass; a sub-shade roller disposed inside a window frame adjacent to the quarter window glass, and connected to a first end of the sub-shade to wind or unwind the sub-shade; a sub-shade bar connected to a second end of the sub-shade; a sub-guide rail disposed inside the door trim to be horizontally disposed at a position spaced apart from a lower side of the sub-shade; and a sub-slider secured to an end of the sub-shade bar and configured to unwind or wind the sub-shade from the sub-shade roller while being moved in a horizontal direction along the sub-guide rail.

The cable may include a plurality of cables, a torpedo may be installed on a selected cable selected among the cables so that the torpedo is moved integrally in conjunction with movement of the selected cable, and the sub-slider may be installed such that the selected cable passes therethrough so that the sub-slider is moved in conjunction with movement of the torpedo in a contact state with the torpedo.

The torpedo may be disposed at an installation position where the sub-slider is located at a position where the sub-shade is fully extended at a time when the main shade is fully extended.

The sub-shade roller may be provided with a sub-spring that provides a restoring force to the sub-shade roller after rotation.

A rotary shaft of the main shade roller may be rotated by being directly connected to a rotary shaft of the motor, and the drum may be rotated in conjunction with the rotary shaft of the main shade roller.

The drum may include a plurality of drums, and a diameter of each of the drums may be determined corresponding to a length of an associated one of the pair of main guide rails.

The driving module may further include: a third drum rotatable by being directly connected to a rotary shaft of the motor; a third cable, to which the sub-slider is secured, having a first side wound on an outer circumferential surface of the third drum so that the third cable moves the sub-slider while being moved in conjunction with rotation of the third drum; and at least one third pulley, on which a second side of the third cable is wound, the third pulley configured to determine a moving path of the third cable.

According to the embodiments of the present disclosure, by the use of the plurality of drums and pulleys that are directly driven in response to the operation of the motor, it is possible to minimize the length of a path for transmitting the driving force of the motor to the shade bar, thereby reducing the load on a transmission path of the driving force.

The shade module may be configured to block out light incident into a vehicle interior through a window glass while being unwound or wound automatically by the driving force.

Accordingly, it is possible to minimize the friction generated during the operation of the shade, thereby obtaining an effect of suppressing malfunction and noise generation.

Further, by driving the plurality of drums and pulleys with a single motor by means of a direct drive method, it is possible to realize a structure in which the main shade applied to the side window glass can be extended in conjunction with the sub-shade applied to the quarter window glass.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
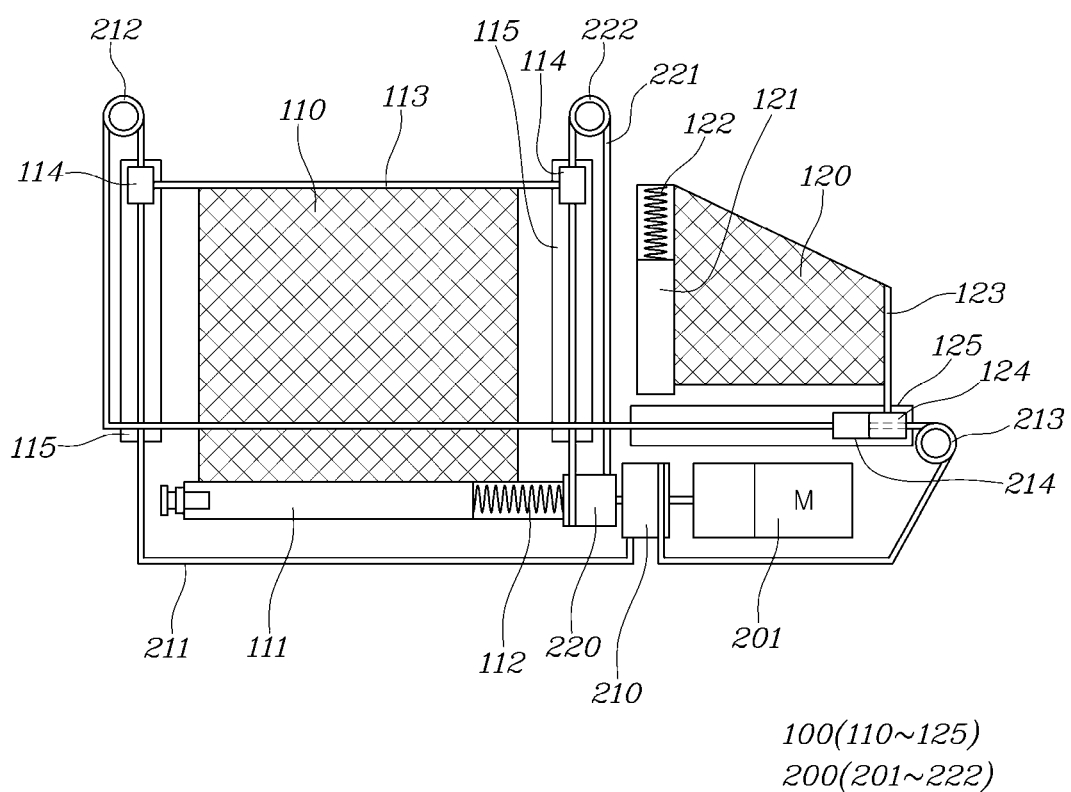
FIG. 1 is a view illustrating an electric window shade apparatus for a vehicle according to an embodiment of the present disclosure.

Hereinafter, exemplary embodiments of the present disclosure will be described in more detail with reference to the accompanying drawings. Various changes to the following embodiments are possible and the scope of the present disclosure is not limited to the following embodiments. The embodiments of the present disclosure are presented to make complete disclosure of the present disclosure and help those who are ordinarily skilled in the art best understand the disclosure. Throughout the drawings, the same reference numerals will refer to the same or like parts.

Figure 2:
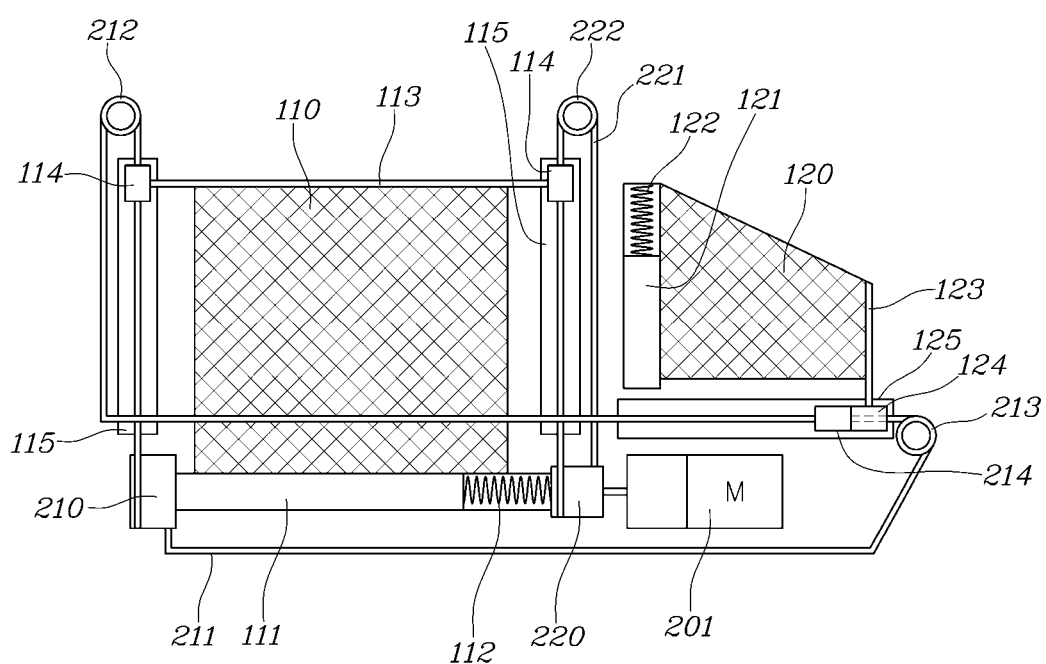
FIGS. 2 and 3 are views illustrating an electric window shade apparatus for a vehicle according to other embodiments of the present disclosure.
Figure 3:
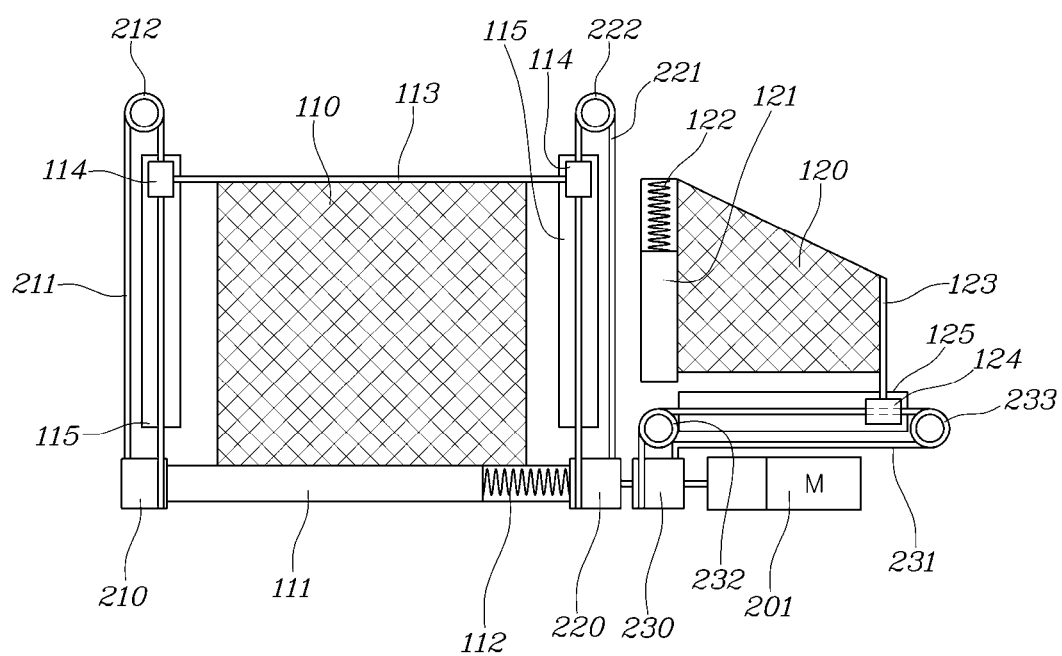

FIG. 1 is a view illustrating an electric window shade apparatus for a vehicle according to an embodiment of the present disclosure, and FIGS. 2 and 3 are views illustrating an electric window shade apparatus for a vehicle according to other embodiments of the present disclosure.

As illustrated in FIG. 1, the electric window shade apparatus for the vehicle according to the embodiment of the present disclosure includes a shade module 100 blocking out light incident into a vehicle interior through a window glass, while being unwound or wound automatically by a driving force; and a driving module 200 providing the driving force to the shade module 100 by the operation of a cable wound on at least one drum directly driven in response to the operation of a motor 201.

The shade module 100 is a module that is extended to block out light incident into the vehicle interior through a side window glass and a quarter window glass of the vehicle, and may be largely divided into a first shade module provided for the side window glass and a second shade module provided for the quarter window glass.

The first shade module includes a main shade 110 blocking out light incident through the side window glass; a main shade roller 111 provided inside a door trim and connected to a first end of the main shade 110 to wind or unwind the main shade 110; a main shade bar 113 connected to a second end of the main shade 110; a pair of main guide rails 115 vertically arranged at respective positions spaced apart from opposite sides of the main shade 110; and a pair of main sliders 114 secured to opposite ends of the main shade bar 113, respectively, and unwinding or winding the main shade 110 from the main shade roller 111 while being moved in respective vertical directions along the pair of main guide rails 115.

Thus, the first shade module is provided such that the main shade 110 is extended or retracted in a vertical direction on the side window glass.

The main shade 110 is a means that is manufactured in a shape conforming to the side window glass to directly block out light, and may be made of various materials that can be implemented as shades.

The main shade 110 is wound on the main shade roller 111 so that the main shade 110 is extended from the main shade roller 111 while being unwound from a wound state, and is retracted onto the main shade roller 111 in response to a winding operation of the main shade roller 111.

The main shade roller 111 is a means for winding or unwinding the main shade 110 and is horizontally mounted inside the door trim.

Here, the main shade roller 111 is provided with a main spring 112 that provides a restoring force to the main shade 110 so that during retraction of the main shade 110 that has been extended during unwinding, the main shade 110 is wound onto the main shade roller 111 by the restoring force provided by the spring 112. During the winding operation of the main shade roller 111, the main spring 112 is deformed by the driving force of the driving module 200, and is restored to its original state by release of the driving force of the driving module 200 to thereby provide the restoring force to the main shade 110.

The main shade bar 113 is connected to an upper end of the main shade 110 to be moved integrally in conjunction with the movement of the main slider 114 to cause the main shade 110 to be extended or retracted in conjunction with the movement of the main shade bar 113.

The pair of main guide rails 115 are provided inside the window frame and are vertically arranged at respective positions spaced apart from the opposite sides of the main shade 110.

The pair of main sliders 114 are installed on the pair of main guide rails 115, respectively, to slide in the respective vertical directions along the main guide rails 115. Here, the opposite ends of the main shade bar 113 are secured to the pair of main guide rails 115, respectively, so that the main shade bar 113 is moved integrally in conjunction with a vertical movement of the main sliders 114. Thus, as the main shade bar 113 is moved in the vertical direction, the main shade 110 is extended or retracted.

The second shade module includes a sub-shade 120 blocking out light incident through the quarter window glass; a sub-shade roller 121 provided inside a window frame adjacent to the quarter window glass, and connected to a first end of the sub-shade 120 to wind or unwind the sub-shade 120; a sub-shade bar 123 connected to a second end of the sub-shade 120; a sub-guide rail 125 provided inside the door trim to be horizontally disposed at a position spaced apart from a lower side of the sub-shade 120; and a sub-slider 124 secured to an end of the sub-shade bar 123 to unwind or wind the sub-shade 120 from the sub-shade roller 121 while being moved in a horizontal direction along the sub-guide rail 125.

Thus, the second shade module is provided such that the sub-shade 120 is extended or retracted in the horizontal direction on the quarter window glass.

The sub-shade 120 is a means that is manufactured in a shape conforming to the quarter window glass to directly block out light, and may be made of various materials that can be implemented as shades.

The sub-shade 120 is wound on the sub-shade roller 121 so that the sub-shade 120 is extended from the sub-shade roller 121 while being unwound from a wound state, and is retracted onto the sub-shade roller 121 in response to a winding operation of the sub-shade roller 121.

The sub-shade roller 121 is a means for winding or unwinding the sub-shade 120, and is vertically disposed inside a window frame between the side window glass and the quarter window glass.

Here, the sub-shade roller 121 is provided with a sub-spring 122 that provides a restoring force to the sub-shade 120 so that during retraction of the sub-shade 120 that has been extended during unwinding, the sub-shade 120 is wound onto the sub-shade roller 121 by the restoring force provided by the sub-spring 122. During the winding operation of the sub-shade roller 121, the sub-spring 122 is deformed by the driving force of the driving module 200, and is restored to its original state by release of the driving force of the driving module 200 to thereby provide the restoring force to the sub-shade 120.

The sub-shade bar 123 is connected to the end of the sub-shade 120 to be moved integrally in conjunction with the movement of the sub-slider 124 to cause the sub-shade 120 to be extended or retracted in conjunction with the movement of the sub-shade bar 123.

The sub-guide rail 125 is horizontally disposed inside the door trim.

The sub-slider 124 is installed on the sub-guide rail 125 to slide in the horizontal direction along the sub-guide rail 125. Here, the end of the sub-shade bar 123 is secured to the sub-guide rail 125 so that the sub-shade bar 123 is moved integrally in conjunction with a horizontal movement of the sub-slider 124. Thus, as the sub-shade bar 123 is moved in the horizontal direction, the sub-shade 120 is extended or retracted.

The driving module 200 is a module that provides the driving force to the first shade module and the second shade module described above, and the driving force is provided to the first shade module and the second shade module by the operation of cables wound on a plurality of drums and pulleys directly driven in response to the operation of the motor 201. The driving module 200 includes the motor 201 provided inside the door trim; a first drum 210 and a second drum 220 rotated by being directly connected to a rotary shaft of the motor 201; a first cable 211 to which any one of the main sliders 114 is secured, and disposed such that a first side thereof is wound on an outer circumferential surface of the first drum 210 so that the first cable 211 moves the main slider 114 while being moved in conjunction with the rotation of the first drum 210; at least one or more first pulleys 212 and 213 arranged such that a second side of the first cable 211 is wound thereon so that the first pulleys 212 and 213 determine a moving path of the first cable 211; a second cable 221 to which a remaining one of the main sliders 114 is secured, and having a first side wound on an outer circumferential surface of the second drum 220 so that the second cable 221 moves the main slider 114 while being moved in conjunction with the rotation of the second drum 220; and at least one second pulley 222 disposed such that a second side of the second cable 221 is wound thereon so that the second pulley 222 determine a moving path of the second cable 221.

Thus, any one of the main sliders 114 is moved by the use of the first drum 210, the first cable 211, and the first pulleys 212 and 213, while the remaining one of the main sliders 114 is moved by the use of the second drum 220, the second cable 221, and the second pulley 222.

Here, the diameters of the first drum 210 and the second drum 220 are determined corresponding to the lengths of the respective pair of main guide rails 115. Thus, it is preferable that the diameters of the first drum 210 and the second drum 220 are properly determined so that the pair of main sliders 114 simultaneously reach the highest point on the pair of main guide rails 115 when the main shade 110 is fully extended.

Further, in this embodiment, the first drum 210 and the second drum 220 are sequentially connected to the rotary shaft of the motor 201 to be rotated integrally in conjunction with each other. The rotary shaft of the motor 201 is directly connected to a rotary shaft of the main shade roller 111 so that the rotary shaft of the main shade roller 111 is rotated in conjunction with the operation of the motor 201. Thus, in response to the operation of the motor 201, the first drum 210, the second drum 220, and the rotary shaft of the main shade roller 111 are rotated in conjunction with each other.

Meanwhile, the positions of the first drum 210 and the second drum 220 may be selectively changed and implemented. For example, as illustrated in FIG. 2, the second drum 220, the rotary shaft of the main shade roller 111, and the first drum 210 may be sequentially connected to the rotary shaft of the motor 201 to be rotated integrally in conjunction with each other.

The sub-slider 124 may be moved in conjunction with the movement of the first cable 211.

To this end, as illustrated in FIG. 1, a torpedo 214 is installed on the first cable 211 so that the torpedo 214 is moved integrally in conjunction with the movement of the first cable 211. Further, the sub-slider 124 is installed such that the first cable 211 passes therethrough so that the sub-slider 124 is moved in conjunction with the movement of the torpedo 214 in a contact state with the torpedo 214.

Here, the time at which the sub-slider 124 is moved may be limited depending on the installation position of the torpedo 214. Thus, the time at which the sub-shade 120 is extended during extension of the main shade 110 may be determined. Further, the maximum moving path along which the sub-slider 124 is moved may be limited depending on the installation position of the torpedo 214.

For example, it is preferable that the installation position of the torpedo 214 is determined to be a point where the sub-slider 124 is located at a position where the sub-shade 120 is fully extended at a time when the main shade 110 is fully extended.

Meanwhile, although in the above-described embodiments the second shade module is operated in conjunction with the first cable, a drum and a pulley may be arranged separately from the first cable to operate the second shade module.

For example, in configuring a driving module 200 as illustrated in FIG. 3, the driving module 200 may include: a third drum 230 rotated by being directly connected to the rotary shaft of the motor 201; a third cable 231 to which the sub-slider 124 is secured, and disposed such that a first side thereof is wound on an outer circumferential surface of the third drum 230 so that the third cable 231 moves the sub-slider 124 while being moved in conjunction with the rotation of the third drum 230; and at least one or more third pulleys 232 and 233 arranged such that a second side of the third cable 231 is wound thereon so that the third pulleys 232 and 233 determine a moving path of the third cable 231. In this case, the installation of the torpedo 214 on the third cable 231 as in the above-described embodiment is not necessary.

Thus, in response to the operation of the motor 201, the third drum 230 is rotated to move the third cable 231, thereby causing the sub-slider 124 to be moved integrally in conjunction with the movement of the third cable 231 to extend the sub-shade 120.

In this case, it is preferable that the diameter of the third drum 230 is determined corresponding to the length of the sub-guide rail 125.

Next, an operating state of the electric window shade apparatus for the vehicle according to the embodiment of the present disclosure configured as described above will be described with reference to the drawings.

FIGS. 4A to 4D are views illustrating the operating state of the electric window shade apparatus for the vehicle according to the embodiment of the present disclosure.

Figure 4A:
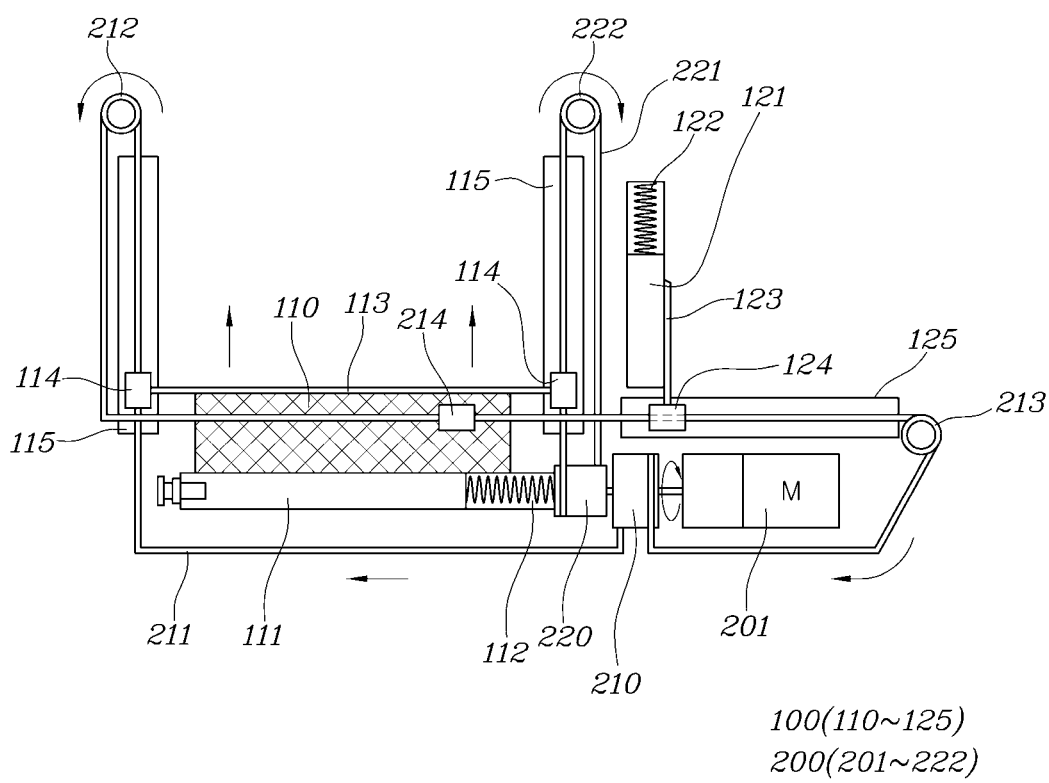
FIGS. 4A to 4D are views illustrating the operating state of the electric window shade apparatus for the vehicle according to the embodiment of the present disclosure.

First, as illustrated in FIG. 4A, when the motor 201 is put into operation, the rotary shaft of the motor 201 is rotated, thereby causing the first drum 210 and the second drum 220 to be rotated.

Accordingly, the first cable 211 and the second cable 221 wound on the first drum 210 and the second drum 220 are moved while being rotated between the first pulleys 212 and 213 and the second pulley 222 in conjunction with the rotation of the first drum 210 and the second drum 220.

As the first cable 211 and the second cable 221 are moved in this way, the pair of main sliders 114 are moved upward along the main guide rails 115, thereby causing the main shade bar 113 secured to the main sliders 114 to be moved upward, with the result that the main shade 110 begins its extending movement while being unwound from the main shade roller 111. At this time, the torpedo 214 provided at the first cable 211 is moved from a position distanced from the sub-slider 124 and thus does not push the sub-slider 124, and the first cable 211 is provided through the sub-slider 124 and thus the sub-slider 124 is not operated.

Figure 4B:
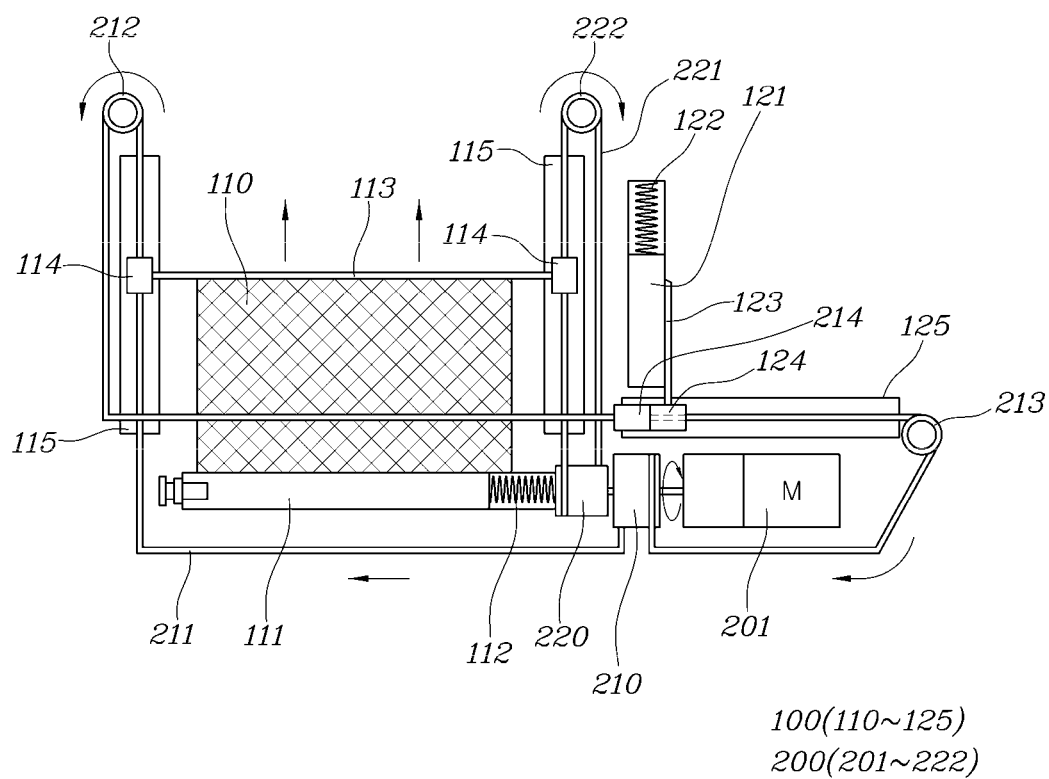

When the motor 201 continues its operation, as illustrated in FIG. 4B, the torpedo 214 is moved to a point where the same comes in contact with the sub-slider 124, and from this point, the torpedo 214 pushes the sub-slider 124 to move the sub-slider 124 in the horizontal direction. Accordingly, the sub-shade bar 123 secured to the sub-slider 124 is moved in the horizontal direction, with the result that the sub-shade 120 begins its extending movement while being unwound from the sub-shade roller 121.

Figure 4C:
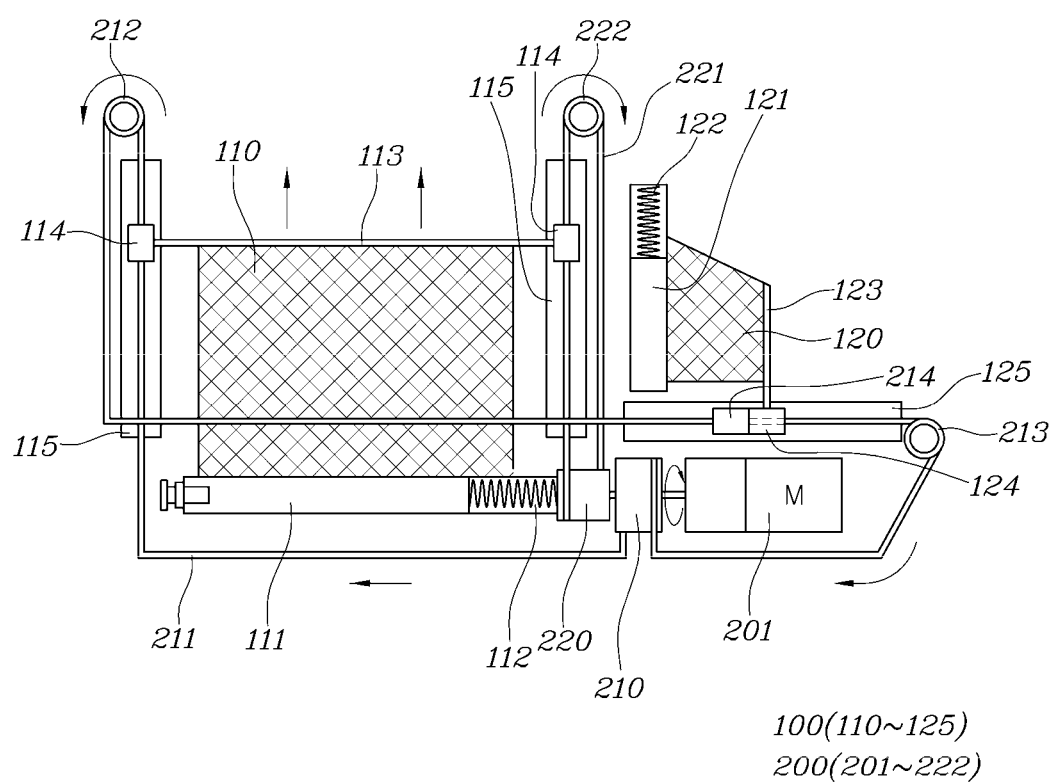

When the motor 201 then continues its operation, as illustrated in FIG. 4C, the main shade 110 is extended as the main sliders 114 continues its movement, and at the same time, the sub-shade 120 is also extended as the torpedo 214 continues to push the sub-slider 124.

Figure 4D:
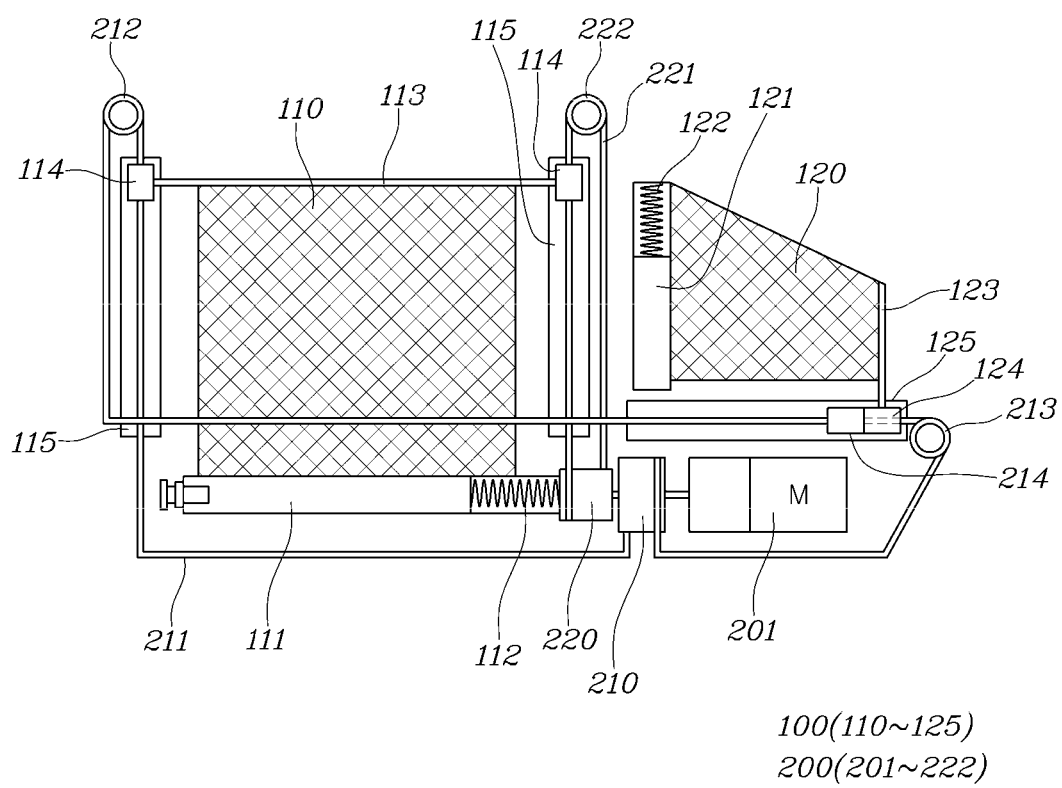

When the motor 201 then continues its operation and the main sliders 114 and the sub-slider 124 reach their maximum moving points as illustrated in FIG. 4D, the main shade 110 and the sub-shade 120 are extended to a fully extended state, and at this time, the motor 201 stops its operation.

In this state, in order to retract the main shade 110 and the sub-shade 120, the motor 201 is rotated in the reverse direction to move the first cable 211 and the second cable 221 in the reverse direction. Accordingly, the main sliders 114 are moved downward, with the result that the main shade 110 is retracted. At this time, the main shade 110 is wound onto the main shade roller 111 by the restoring force of the main spring 112 provided in the main shade roller 111.

When the torpedo 214 is also moved in the reverse direction, thereby causing the force exerted to push the sub-slider 124 by the torpedo 214 to be released, the sub-shade 120 is wound onto the sub-shade roller 121 by the restoring force of the sub-spring 122 provided in the sub-shade roller 121, and the sub-slider 124 is also moved in the reverse direction integrally in conjunction with the movement of the torpedo 214 to return to its original position.

Next, an experiment was conducted to compare operating noise levels and operating current values of the electric window shade apparatus (Example) according to the embodiment of the present disclosure with those of an electric window shade apparatus (Comparative Example) of a flex wire drive type according to the related art, and the results are illustrated in Table 1 below.

The experiment was conducted by measuring noise levels and current values generated during extension and retraction of shades while operating the Example and the Comparative Example.

TABLE 1

| Classification | | Comparative Example | Example |
| --- | --- | --- | --- |
| Noise | Extension | 45 dB | 39 dB |
| | Retraction | 46 dB | 40 dB |
| Current | Extension | 4.3 A | 0.6 A |
| | Retraction | 3.0 A | 0.4 A |

As can be seen from the results of Table 1, it was possible to ascertain that the noise levels were improved (reduced) by a degree of about 6 dB (based on MAX values) in the Example compared to the Comparative Example.

It was also possible to ascertain that the operating current values were reduced to about 1/7 in the Example compared to the Comparative Example.

Although the exemplary embodiments have been described in the detailed description of the present disclosure, it should be understood that various modifications can be made without departing from the scope of the present disclosure. Therefore, the scope of the present disclosure should not be limited to the described embodiments, but should be determined by the accompanying claims and equivalents thereof.

What is claimed is:

1. An electric window shade apparatus for a vehicle, the electric window shade apparatus comprising:
    a shade module configured to be unwound or wound automatically by a driving force so as to move with respect to a window glass; and
    a driving module configured to provide the driving force to the shade module by an operation of a cable wound on at least one drum driven by a motor,
    wherein the shade module comprises:
        a main shade configured to be unwound or wound so as to move with respect to a side window glass;
        a main shade roller disposed inside a door trim and connected to a first end of the main shade to wind or unwind the main shade;
        a main shade bar connected to a second end of the main shade;
        a pair of main guide rails vertically arranged at respective positions spaced apart from opposite sides of the main shade; and
        a pair of main sliders secured to opposite ends of the main shade bar, respectively, and configured to unwind or wind the main shade from the main shade roller while being moved in respective vertical directions along the pair of main guide rails,
    a rotary shaft of the main shade roller is rotated by being directly connected to a rotary shaft of the motor,
    the drum is rotated in conjunction with the rotary shaft of the main shade roller, and
    the shade module further comprises:
        a sub-shade configured to be unwound or wound so as to move with respect to a quarter window glass;
        a sub-shade roller disposed inside a window frame adjacent to the quarter window glass, and connected to a first end of the sub-shade to wind or unwind the sub-shade;
        a sub-shade bar connected to a second end of the sub-shade;
        a sub-guide rail disposed inside the door trim to be horizontally disposed at a position spaced apart from a lower side of the sub-shade; and
        a sub-slider secured to an end of the sub-shade bar and configured to unwind or wind the sub-shade from the sub-shade roller while being moved in a horizontal direction along the sub-guide rail.

2. The electric window shade apparatus of claim 1, wherein the driving module comprises:
    the motor disposed inside the door trim;
    the at least one drum rotatable by being connected to the motor;
    at least one cable wound on an outer circumferential surface of the drum so that the cable operates the shade module while being moved in conjunction with rotation of the drum; and
    at least one pulley, on which the cable is wound, the pulley configured to determine a moving path of the cable.

3. The electric window shade apparatus of claim 2, wherein the driving module comprises:
    a first drum and a second drum rotatable by being directly connected to the rotary shaft of the motor;
    a first cable wound on an outer circumferential surface of the first drum so that the first cable operates the shade module while being moved in conjunction with rotation of the first drum;
    at least one first pulley, on which the first cable is wound, the first pulley configured to determine a moving path of the first cable;
    a second cable wound on an outer circumferential surface of the second drum so that the second cable operates the shade module while being moved in conjunction with rotation of the second drum; and
    at least one second pulley, on which the second cable is wound, the second pulley configured to determine a moving path of the second cable.

4. The electric window shade apparatus of claim 1, wherein the cable comprises a plurality of cables, and each of the pair of main sliders is secured to an associated one of the cables to be moved integrally in conjunction with movement of the cable.

5. The electric window shade apparatus of claim 1, wherein the main shade roller is provided with a main spring that provides a restoring force to the main shade after rotation.

6. The electric window shade apparatus of claim 1, wherein the cable comprises a plurality of cables,
    a torpedo is installed on a selected cable selected among the cables so that the torpedo is moved integrally in conjunction with movement of the selected cable, and
    the sub-slider is installed such that the selected cable passes therethrough so that the sub-slider is moved in conjunction with movement of the torpedo in a contact state with the torpedo.

7. The electric window shade apparatus of claim 6, wherein the torpedo is disposed at an installation position where the sub-slider is located at a position where the sub-shade is fully extended at a time when the main shade is fully extended.

8. The electric window shade apparatus of claim 1, wherein the sub-shade roller is provided with a sub-spring that provides a restoring force to the sub-shade roller after rotation.

9. The electric window shade apparatus of claim 1, wherein the drum comprises a plurality of drums, and a diameter of each of the drums is determined corresponding to a length of an associated one of the pair of main guide rails.

10. The electric window shade apparatus of claim 3, wherein the driving module further comprises:
 a third drum rotatable by being directly connected to the rotary shaft of the motor;
 a third cable, to which the sub-slider is secured, wound on an outer circumferential surface of the third drum so that the third cable moves the sub-slider while being moved in conjunction with rotation of the third drum; and
 at least one third pulley, on which the third cable is wound, the third pulley configured to determine a moving path of the third cable.

11. The electric window shade apparatus of claim 1, wherein the shade module is configured to block out light incident into a vehicle interior through a window glass while being unwound or wound automatically by the driving force.

12. An electric window shade apparatus for a vehicle, the electric window shade apparatus comprising:
 a shade module configured to be unwound or wound automatically by a driving force so as to move with respect to a window glass; and
 a driving module configured to provide the driving force to the shade module by an operation of a cable wound on at least one drum driven by a motor,
 wherein the shade module comprises:
  a main shade configured to be unwound or wound so as to move with respect to a side window glass;
  a main shade roller disposed inside a door trim and connected to a first end of the main shade to wind or unwind the main shade;
  a main shade bar connected to a second end of the main shade;
  a pair of main guide rails vertically arranged at respective positions spaced apart from opposite sides of the main shade; and
  a pair of main sliders secured to opposite ends of the main shade bar, respectively, and configured to unwind or wind the main shade from the main shade roller while being moved in respective vertical directions along the pair of main guide rails,
 a rotary shaft of the main shade roller is rotated by being directly connected to a rotary shaft of the motor,
 the drum is rotated in conjunction with the rotary shaft of the main shade roller, and
 the driving module comprises:
  the motor disposed inside the door trim;
  the at least one drum rotatable by being connected to the motor;
  at least one cable wound on an outer circumferential surface of the drum so that the cable operates the shade module while being moved in conjunction with rotation of the drum;
  at least one pulley, on which the cable is wound, the pulley configured to determine a moving path of the cable;
  a first drum and a second drum rotatable by being directly connected to the rotary shaft of the motor;
  a first cable wound on an outer circumferential surface of the first drum so that the first cable operates the shade module while being moved in conjunction with rotation of the first drum;
  at least one first pulley, on which the first cable is wound, the first pulley configured to determine a moving path of the first cable;
  a second cable wound on an outer circumferential surface of the second drum so that the second cable operates the shade module while being moved in conjunction with rotation of the second drum;
  at least one second pulley, on which the second cable is wound, the second pulley configured to determine a moving path of the second cable;
  a third drum rotatable by being directly connected to the rotary shaft of the motor;
  a third cable, to which a sub-slider is secured, wound on an outer circumferential surface of the third drum so that the third cable moves the sub-slider while being moved in conjunction with rotation of the third drum; and
  at least one third pulley, on which the third cable is wound, the third pulley configured to determine a moving path of the third cable.

* * * * *